March 21, 1961

S. V. STROMBERG 2,975,602

APPARATUS AND METHOD FOR PLACING AND
FINISHING CONCRETE IN DITCHES

Original Filed Sept. 2, 1958

INVENTOR.
SYLVESTER V. STROMBERG

BY
ATTORNEY

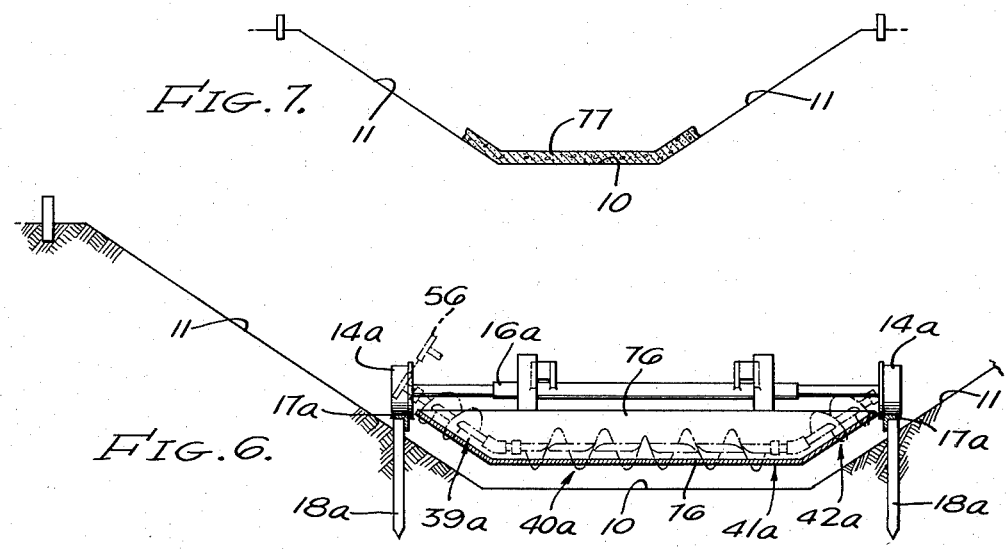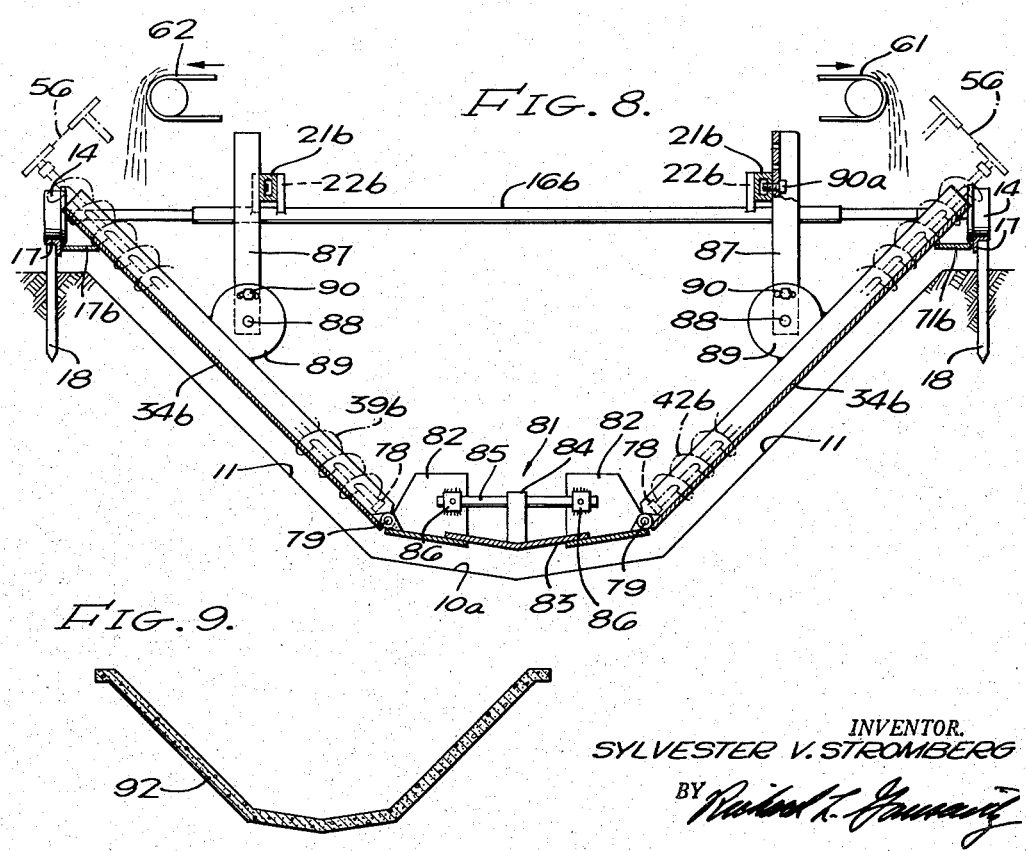

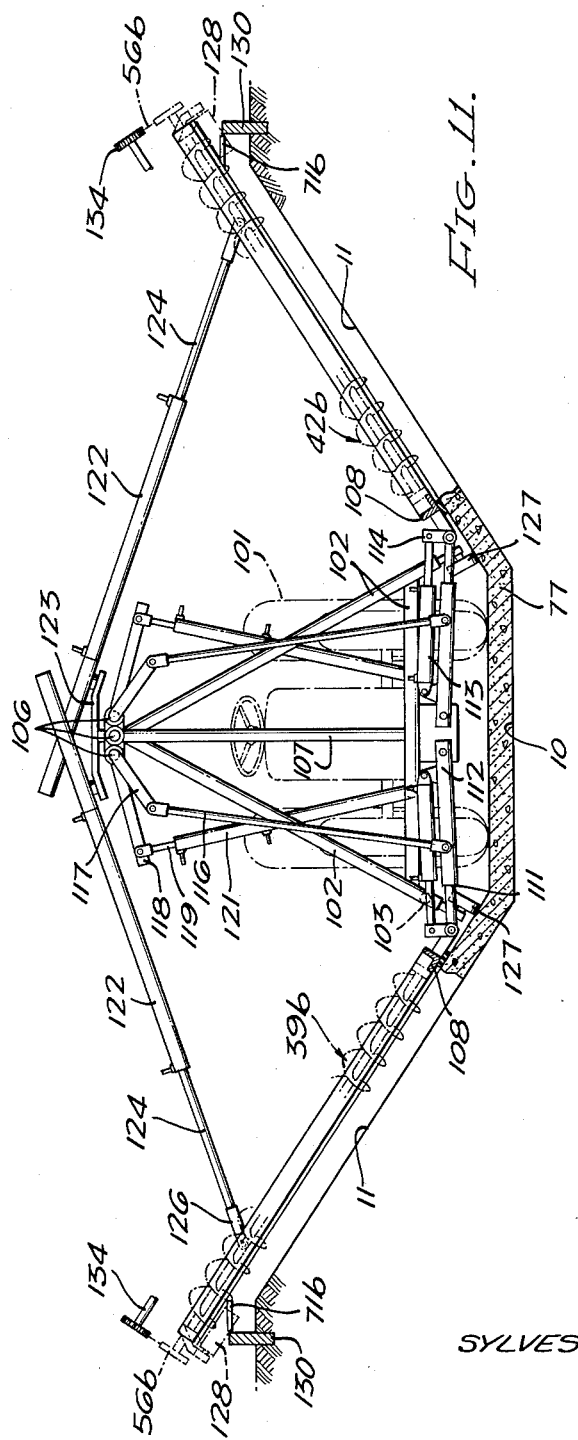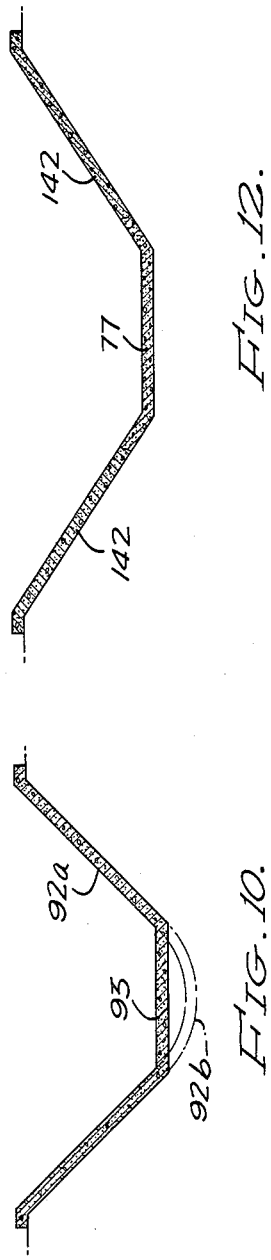

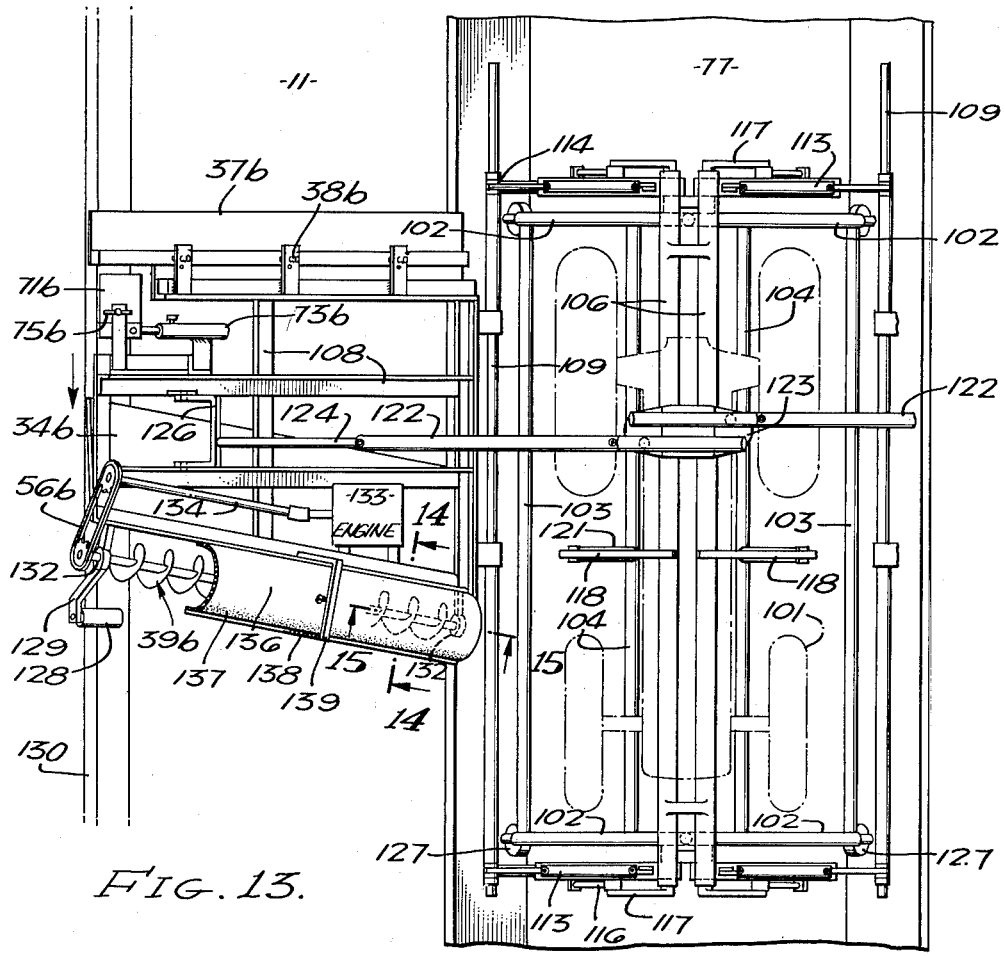
FIG. 13.
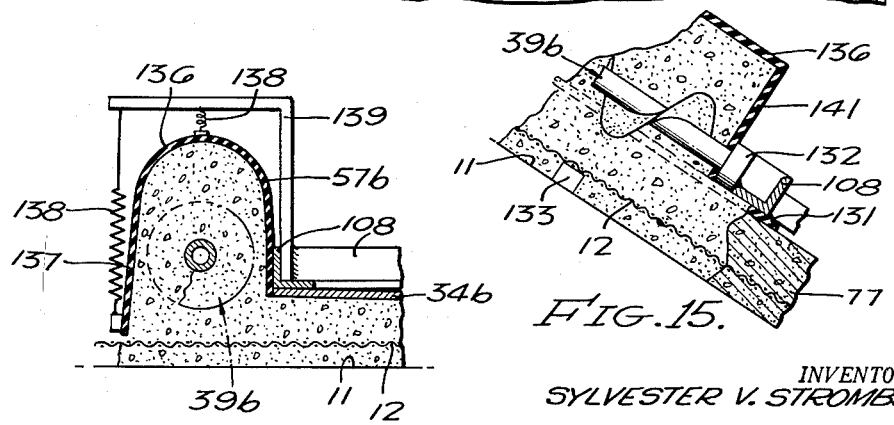
FIG. 14.
FIG. 15.
INVENTOR.
SYLVESTER V. STROMBERG
BY
ATTORNEY United States Patent Office 2,975,602
Patented Mar. 21, 1961

2,975,602
APPARATUS AND METHOD FOR PLACING AND FINISHING CONCRETE IN DITCHES

Sylvester V. Stromberg, 13552 Yockey, Westminster, Calif.

Continuation of application Ser. No. 758,451, Sept. 2, 1958. This application Feb. 23, 1960, Ser. No. 10,511

17 Claims. (Cl. 61—63)

This invention relates to an apparatus and method for placing and finishing concrete in ditches and other locations where it is necessary to pave a relatively steeply inclined surface. This application is a continuation of my co-pending application serial No. 758,451, filed September 2, 1958, and now abandoned.

The problem of placing and finishing concrete in ditches or channels, such as drainage and irrigation ditches, has been the subject of a substantial amount of prior-art activity because of the poor quality and high cost of manual placing and finishing. One prior-art approach involved placing the concrete by passing it through hoses and nozzles, by the "Gunnite" method, but this has proved to be relatively unsatisfactory for a number of important reasons including the fact that it is impractical or impossible to place concrete incorporating relatively large aggregates. Furthermore, such "Gunnite" operations are relatively slow since the concrete must be passed through relatively small-diameter nozzles, and even after the concrete is placed it must be finished by a laborious operation.

Other prior-art approaches have involved the use of relatively high-speed vibration apparatus to tamp the concrete in order to compact the same and cause the aggregates to settle. Such vibration apparatus is deficient for reasons including the fact that conventional side-hill vibration techniques cause undesirable separation of the cement from the aggregate, and undesirable aeration, so that strength is lessened. Furthermore, and very importantly, such vibration apparatus is unsatisfactory in regard to placing of the concrete in that the concrete is caused to slide down hill at an excessive rate. The vibration, and other, approaches have involved the application of high pressures onto the concrete in order to force the same into the desired shapes and locations, but this is unsatisfactory for reasons including the fact that the pressure apparatus must be extremely heavy, bulky and expensive. Furthermore, such apparatus does not properly place the coarser aggregates, or work the concrete in a manner resulting in increased strength thereof. Additional approaches have involved complicated troweling apparatus, special placement hoppers, and much other expensive and bulky equipment which was difficult and unsatisfactory to operate and did not produce the desired end results.

In view of the above and other factors characteristic of concrete placing and finishing apparatus and methods, it is an object of the present invention to provide a method and apparatus for placing and finishing concrete in ditches in a highly simple and economical manner to produce an extremely strong and highly satisfactory end product.

A further object is to provide an apparatus and method for placing, working, mixing, compacting, tamping and finishing concrete in a single operation to provide a very strong and economically-produced end product.

A further object is to provide an apparatus and method for placing and finishing concrete in ditches without being limited to the smaller sizes of aggregates and without requiring substantial hand-finishing operations.

A further object is to provide a concrete placing and finishing apparatus which is light in weight and simple in operation, which is readily transported, and which requires only a small engine.

These and other objects and advantages of the present invention will be more fully set forth in the following specification and claims, considered in connection with the attached drawings to which they relate.

In the drawings:

Figure 6 is an elevational view, largely schematic, showing the front of an apparatus for paving only the bottom and lower side portions of a ditch;

Figure 7 is a transverse section showing the concrete applied with the apparatus of Figure 6;

Figure 8 is a front elevational view, largely schematic, illustrating an embodiment which is adjustable for different ditches having different sizes and angularities;

Figure 9 is a transverse section illustrating the monolithic slab formed with the apparatus of Figure 8;

Figure 10 is a transverse section illustrating various shapes of slabs which may be formed with the apparatus of Figure 8;

Figure 11 is a front elevational view, largely schematic, showing an additional embodiment in which the placing and finishing apparatus is mounted on a tractor or similar vehicle which rides along the bottom of the ditch, on the runway portion illustrated in Figure 7;

Figure 12 is a section showing the concrete applied in two operations, with the apparatus of Figures 6 and 11;

Figure 13 is a plan view illustrating the center and one side portion of the apparatus of Figure 11, a portion of the shroud being broken away and sectioned in order to better illustrate the screw element;

Figure 14 is an enlarged fragmentary sectional view on line 14—14 of Figure 13; and Figure 15 is an enlarged fragmentary sectional view on line 15—15 of Figure 13.

Figure 1:
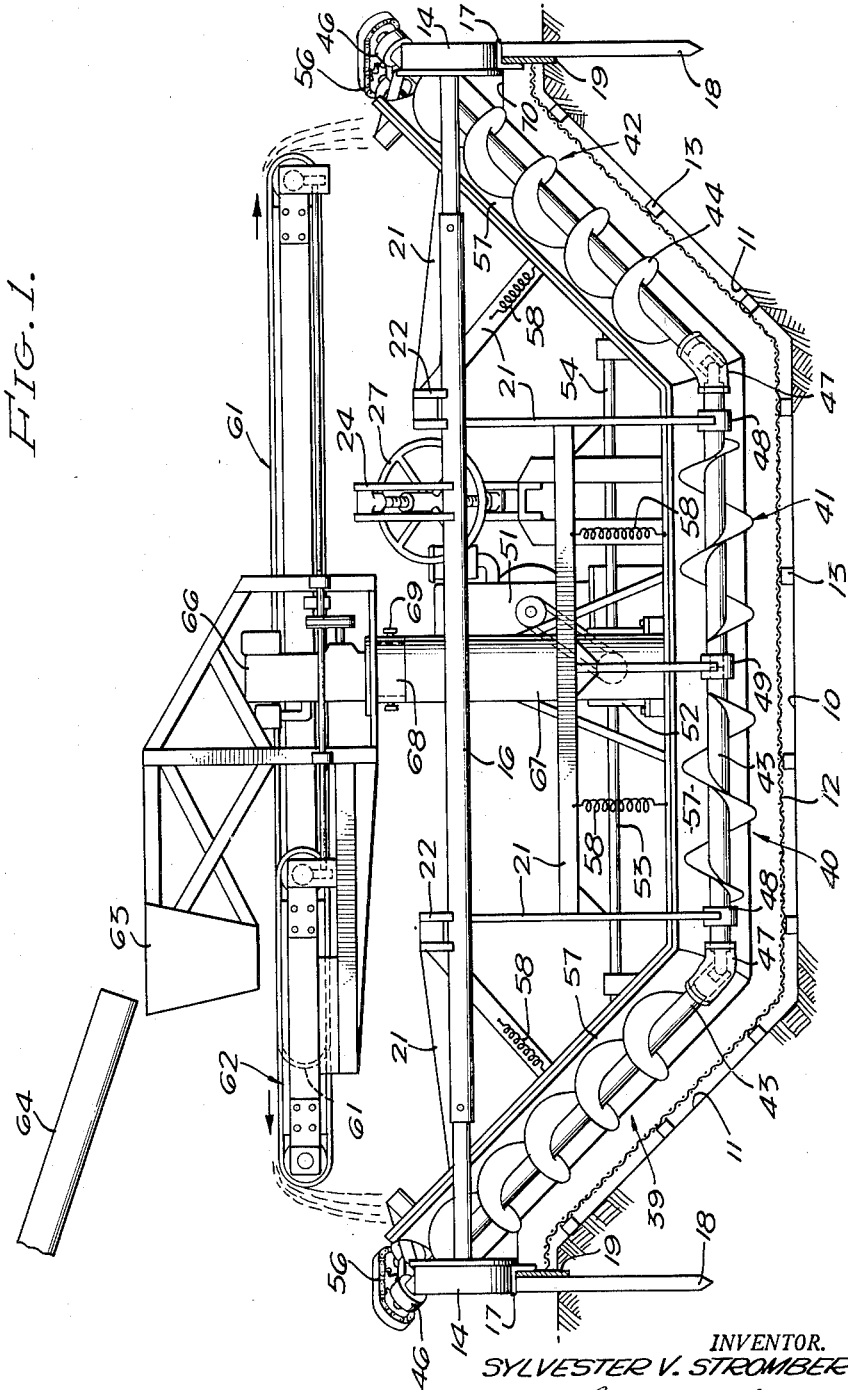
Figure 1 is an elevational view illustrating a first embodiment of the invention as viewed from the front.

Proceeding first to a description of the embodiment of Figures 1-5, the apparatus is illustrated as employed in lining a previously-formed ditch or channel having a flat bottom 10 and relatively steeply inclined sides 11 each of which is shown as lying in a plane. The concrete is applied over reinforcing mesh, schematically illustrated at 12, which is initially held above the ground by means of a plurality of suitably-spaced concrete blocks 13. The mesh 12 is conventionally very coarse, each opening being at least four inches on a side.

The apparatus comprises four wheels 14 which are suitably journalled at opposite ends of two axles 16 disposed parallel to each other and transversely of the ditch. The wheels are flanged to ride on suitable track means at opposite edges of the ditch, for example on angle irons 17. The angle irons are supported on a large number of posts 18 driven into the ground, and also on plates 19 disposed beneath the angle irons and inwardly of the posts.

Plates 19 are vertically disposed and serve the additional purpose of providing side forms for the concrete.

The axles 16 are pivotally connected to a frame 21, illustrated as formed of a number of suitably welded angle irons. Such pivotal connections comprise ears or cranks 22 which are rigidly welded to the axles 16 and are secured to frame 21 by pivots shown at 23 in Figure 3. Means are provided for adjusting the elevation of frame 21 relative to axles 16, and are illustrated to comprise cranks 24 also welded to the axles 16. The outer ends of cranks 24 are pivotally connected to threaded shafts 26, the latter being connected by turnbuckle wheels 27 to oppositely-threaded shafts 28. The outer end of each threaded shaft 28 is pivoted to the frame 21, the relationship being such that rotation of the turn-buckle wheels 27 will either bring the connected shafts 26 and 28 together or force them apart.

Figure 3:
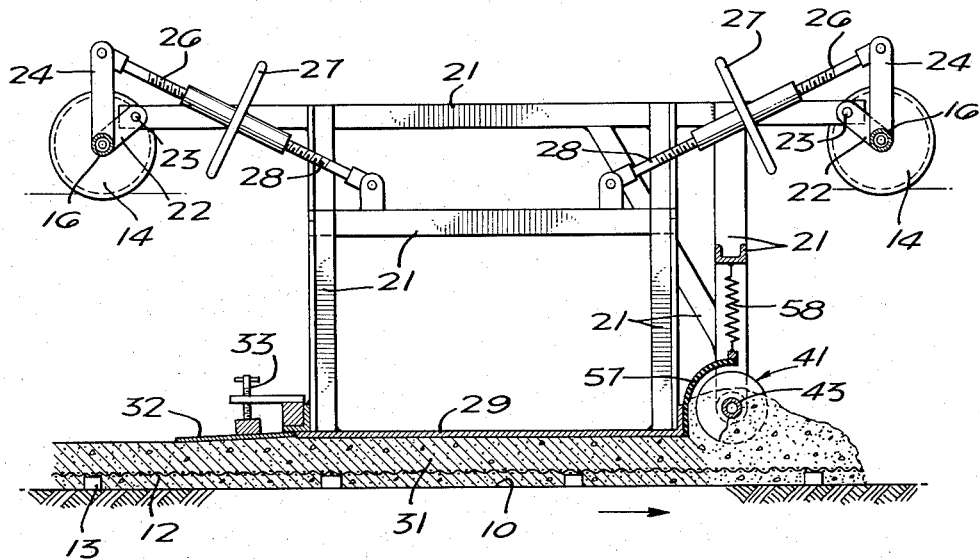
Figure 3 is a section taken on line 3—3 of Figure 2 and showing concrete being placed in the bottom of the ditch.

Referring to Figure 3, it will be understood that rotation of the left turnbuckle wheel 27 in a direction to force the connected shafts 26 and 28 apart will operate through crank 24 (at the left in Figure 3) to rotate the left axle 16 counterclockwise. This operates to rotate the ears or cranks 22 on the left axle 16 in the same direction, or counterclockwise, which lifts the frame 21 to a higher elevation. A similar operation, with corresponding lifting action relative to frame 21, occurs upon corresponding rotation of wheel 27 of the adjustment apparatus illustrated at the right in Figure 3. Such lifting of the frame 21 is accompanied by a slight rotation of the wheels 14. Rotation of the turnbuckle wheels 27 in the opposite directions effects lowering of frame 21 in a manner converse to that described.

A generally horizontal pressure plate 29 is mounted across substantially the full width of the ditch bottom 10, being suitably welded or otherwise secured to the lower portions of frame 21 as indicated in Figure 3. The plate 29 bears downwardly on the wet concrete, indicated at 31, to provide an initial finishing operation. A subsequent or final finishing operation is effected by a finishing plate 32 (Figure 3) having its forward edge welded to the rear edge of pressure plate 29, and also extending across substantially the full width of ditch bottom 10. Adjustment means, indicated as screws 33 which bear downwardly on the finishing plate 32 to bend the same into closer contact with concrete 31, are provided to permit accurate control of the final finishing operation.

Figure 4:
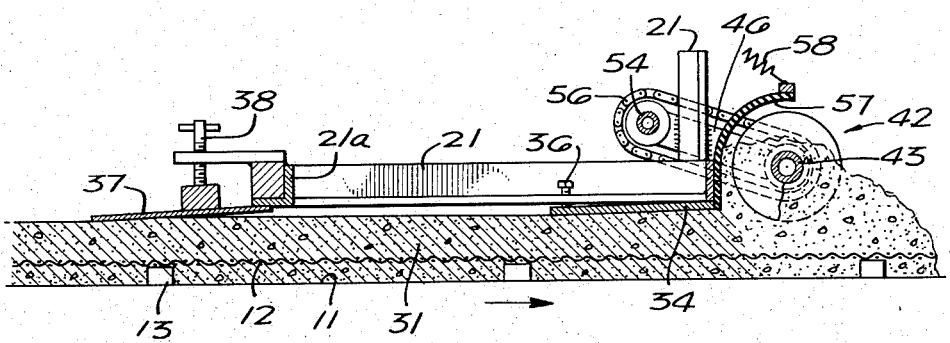
Figure 4 is a section taken on the broken line 4—4 of Figure 2, in somewhat larger scale, and showing the placing of concrete on one side wall of the ditch.

Mold boards 34, formed of metal, are mounted transversely above the side walls 11 of the ditch and generally parallel thereto. Referring to Figure 4, each mold board 34 is pivotally connected by suitable means, not shown, to frame 21 starting at a point adjacent the forward edge of pressure plate 29. Screws 36 are threaded downwardly through portions of frame 21 and bear against the rear edges of mold boards 34 in order to cause the same to assume a small amount of angularity relative to the ditch walls 11.

Finishing plates 37 for the concrete 31 on the ditch side walls 11 are illustrated in Figure 4 as being welded at their forward edges to portions 21a of the frame. Screws 38 are threaded downwardly through the frame into engagement with such finishing plates in order to bend the latter downwardly to the illustrated somewhat angular positions.

Figure 2:
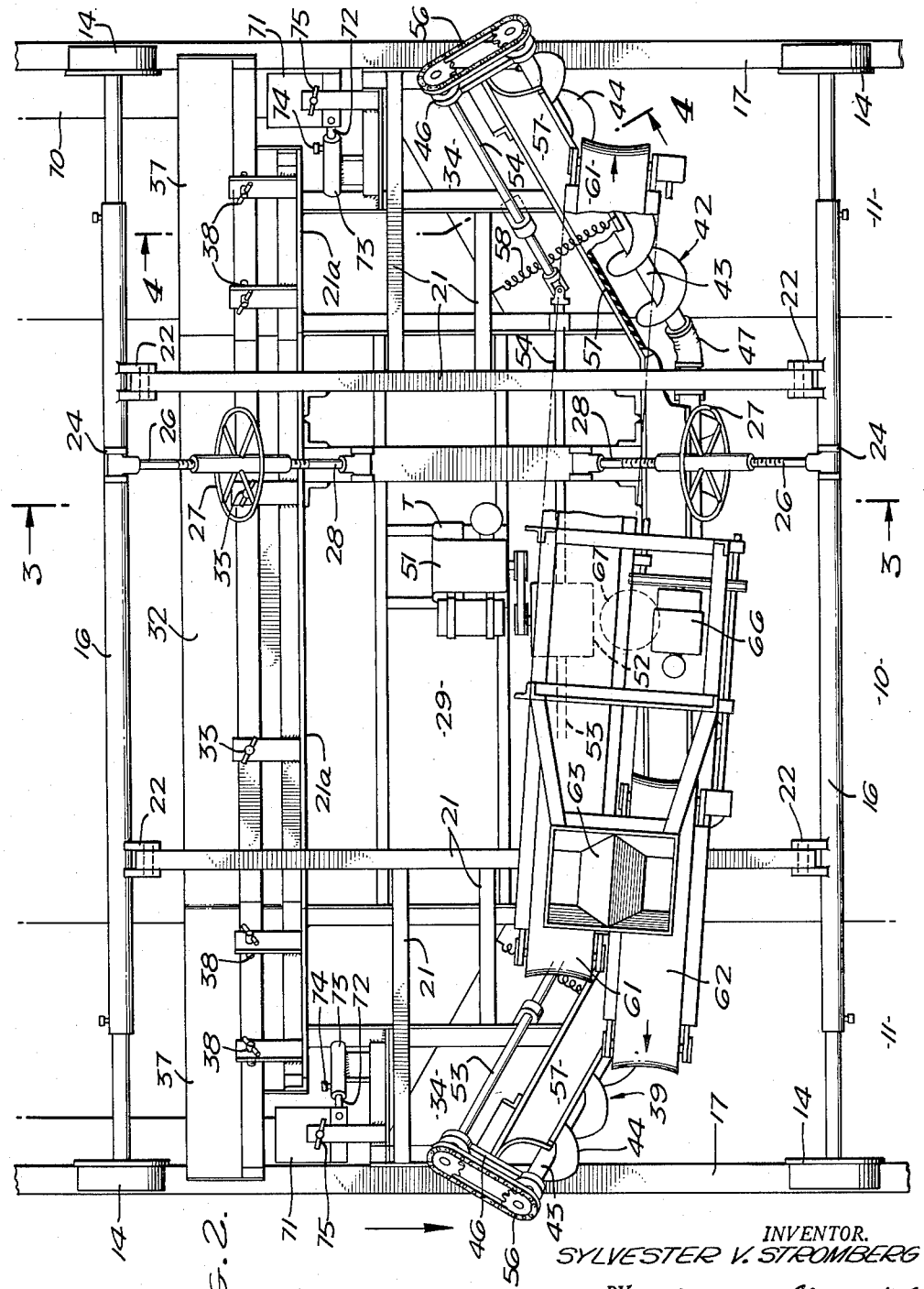
Figure 2 is a plan view of the showing of Figure 1.

As illustrated in Figure 2, the mold boards 34 incline rearwardly from a vertical plane which is perpendicular to the longitudinal axis of the ditch. Thus, the upper end of each mold board is spaced a substantial distance rearwardly from the lower end thereof, the latter being adjacent the front edge portion of pressure plate 29 as previously indicated. The finishing plates 37 are shown as being in line with finishing plate 32, parallel to the above-mentioned vertical plane. A space or gap is preferably provided between mold boards 34 and finishing plates 37 to permit visual inspection of the concrete after placing thereof and before final finishing.

From the above it will be understood that adjustment of the turnbuckle wheels 27 (Figure 3) raises or lowers the entire frame 21 together with pressure plate 29, mold boards 34, and finishing plates 32 and 37. The exact positions of the mold boards and finishing plates relative to the frame may then be independently adjusted by means of the screws 33, 36 and 38 to provide the proper pressure and angle relative to the concrete. The thickness and finish of the concrete slab may thus be accurately adjusted for both the sides and bottom of the ditch.

According to the present invention, means are provided in advance of the finishing elements 34 and 37 to effect mixing, agitating, compacting, working, laying-up, folding, placing, tamping and initial finishing of the concrete which is poured as will be described subsequently. These means comprise screw elements which are rotated about their longitudinal axes, such axes being disposed transverse to the direction of motion of the apparatus and generally parallel to the sides 11 of the ditch. More particularly, the screw elements comprise screw augers 39 and 42 having shafts 43 and helical blades 44. As an illustration of an auger which has been found highly satisfactory, the outer diameter of the blade 44 may be 9 inches and the pitch thereof 60°. Other and corresponding augers 40 and 41 are provided in advance of elements 29 and 32, but these form no part of the invention. It is to be understood that the use of the term "auger" is not intended to denote any boring function. Instead, it is a convenient way of denoting the described helical blade construction.

Bearing means are provided to rotatably mount the screw augers 39—42 in advance of pressure plate 29 and mold boards 34 and at such elevations that the lower peripheral portions of blades 44 penetrate below the pressure plate and mold boards for a small distance. Such penetration of the peripheral blade portions beneath the mold boards and pressure plate effects placement of the larger aggregates at lower elevations so that a pad of grout is formed thereabove. This operation is analogous to tamping, and permits the finishing elements 29, 32, 34 and 37 to perform their functions in a highly satisfactory manner.

If the peripheral portions of the helical auger blades penetrate too deeply beneath the pressure plate and mold boards, the concrete will be forced down (toward the ditch walls) an excessive distance, and the pressure plate and mold boards will then not exert sufficient pressure on the concrete surface to provide proper finishing. It has been found that the penetration of the lower peripheral portions of blades 44 beneath the pressure plate 29 and mold boards 34 is preferably in the neighborhood of one-half inch for conventional concrete mixes. Such conventional mixes may have aggregate sizes up to about one inch.

The shaft 43 of screw auger 39, at the left in Figures 1 and 2, has its upper end suitably journalled in a bearing bar 46 which is mounted on frame 21 and forms a part thereof. The lower end of the shaft of screw 39 is connected to a covered universal joint 47. Universal joint 47 connects to the shaft of the second screw auger 40, such shaft being suitably journalled in bearings 48 and 49 which are suspended from frame 21. The next auger 41 is mounted in the same manner as auger 40, whereas auger 42 is mounted correspondingly to auger 39. The shafts for augers 40 and 41 are preferably not connected except through the drives therefor. The augers 39 and 42 for the sides 11 of the ditch are disposed generally parallel to the associated mold boards 34, so that they incline rearwardly from the above-mentioned vertical plane which is perpendicular to the ditch axis.

The augers are suitably rotated about their longitudinal axes by means of a variable speed gas engine 51 which may be mounted above pressure plate 29 and connected to suitable reduction gearing indicated at 52. Referring particularly to Figure 2, the reduction gearing 52 is connected to jointed shafts 53 and 54 which are suitably journalled in frame 21 including bearing bar portions 46 thereof. The outer ends of the shafts 53 and 54 are connected through suitable sprocket and chain means 56 to the outer ends of the shafts of augers 39 and 42. Engine speed, and thus shaft rotation speed, is controlled by means of a throttle schematically indicated at T in Figure 2.

Referring particularly to Figure 1, it is pointed out that the blades 44 of the various screw augers are illustrated as wound in opposite directions on opposite sides of the central bearing 49. The blades of augers 41 and 42 correspond to each other and the blades of augers 39 and 40 correspond to each other.

The blades of augers 39 and 42 are so wound, and the drives therefor are so connected, that such augers tend to effect movement of concrete up the sides of the ditch. By this it is meant that if augers 39 and 42 were enclosed in closely-fitting tubular conduits, they would move substance through such conduits in directions from the bottom of the ditch up the sides thereof. It is emphasized, however, that screw augers 39 and 42 do not act the same as conventional conveyors, this being evidenced by the fact that an increase in auger speed effects an increase in the rate of downward (not upward) flow of concrete.

A scraper and partial shroud means 57 is mounted at the rear of the augers 39—42 and extends upwardly from the aligned forward edges of pressure plate 29 and mold boards 34 as shown in Figures 3 and 4. The scraper and partial shroud means is suitably connected at its lower edge to the frame 21 and is preferably concentric to the augers but spaced therefrom a distance at least sufficient to permit passage of coarse aggregate therebetween. Resilient means, such as springs 58, are connected to the upper edge portion of the element 57 to associate the same with frame 21. Springs 58, and the fact that the scraper and shroud means is preferably formed of resilient material such as thick belting, permit the augers to clear themselves of especially large aggregates without resulting in a binding action. The elements 57 maintain the concrete in the screws, and insure that all of the concrete passes beneath pressure plate 29 and mold boards 34 where it is automatically finished as previously described.

Means are provided to convey mixed concrete, such as from a transit-mix truck, to the ditch at points immediately in advance of the augers 39 and 42 and adjacent the upper regions thereof. Because of the inclination of augers 39 and 42 rearwardly from the above-mentioned vertical plane perpendicular to the ditch axis, the force of gravity causes flow of the concrete against the augers. When the augers are rotated about their longitudinal axes as previously indicated, there are two distinct countercurrents of concrete present at each side 11 of the ditch. One such current is generally upward in direction and is present in the portion of the concrete within the confines of the auger 39 or 42. The other current is in the portion of the concrete adjacent the auger 39 or 42 and comprises a downflow into the bottom portion of the ditch. The last-named current greatly predominates over the first, otherwise the concrete would not reach the lower regions of the augers.

As previously indicated, the over-all rate of downward feed is proportional to the rotational speed of the screw. Thus, when it is desired to place more concrete in the bottom of the ditch, the throttle T of the engine 51 is operated to speed the drive for the augers.

The concrete conveying means is illustrated schematically to comprise a relatively long horizontal conveyor 61 and a short horizontal conveyor 62 having their ends lapped and disposed beneath a common hopper 63 into which concrete may be introduced by a chute 64 from a transit-mix truck. Each conveyor 61 and 62 may comprise a concave belt and may be driven, through suitable shafts and gearing, from an engine 66. The conveyors 61 and 62 operate to move concrete in opposite directions from hopper 63 and discharge the concrete forwardly adjacent the upper ends of augers 39 and 42 as shown in Figures 1 and 2.

The elements 61—63 and 66 are mounted on a strong post 67 which is rigidly anchored above pressure plate 29. Such mounting comprises a rotatable sleeve 68 (Figure 1) and locking means 69 which selectively permit conjoint rotation of the conveyors, hopper and engine about a vertical axis to thereby dispose the lapped conveyor ends and the hopper 63 selectively adjacent either side of the ditch. When the parts are properly positioned, the locking means 69 are operated to prevent undesired rotation. In this manner, the conveyor or feeding means may be adjusted to feed from a truck disposed selectively at either side of the ditch. Suitable counterweight means, not shown, may be provided to balance the weights on opposite sides of the sleeve 68.

Means are provided to finish the berms 70 (horizontal edges or lips) at the upper edges of the concrete slabs on side walls 11, such means being adjustable for different depths of ditches. Referring to Figure 2, such means may comprise in each instance a plate or scraper element 71 which is fixedly secured to a rod 72, the latter being slidably mounted in a sleeve 73. Sleeve 73, in turn, is rigidly secured to frame 21, and inclines upwardly parallel to side wall 11 in a vertical plane which is perpendicular to the axis of the ditch. Means 74 are provided to lock the rod 72 at any desired position in sleeve 73, so that the elevation of plate or scraper 71, and also the lateral position thereof, may be adjusted until the plate 71 will be in the desired scraping and pressure contact with berm 70. Manually-operated screw means 75 are threaded downwardly through a portion of frame 21 and into engagement with the upper surface of each plate 71 to permit adjustment of the downward pressure exerted on the berm.

*Summary of the method, particularly with relation to the embodiment of Figures 1–5*

The method relates to the paving of a surface which is sufficiently inclined that conventional free-flowing concrete mixes poured thereon will flow downhill, adjacent augers 39 and 42, at a substantial rate as distinguished from a barely discernible creeping. The inclination angle may vary somewhat, as illustrated in various figures of the drawings, but is always substantially greater than the inclination at a curve of a banked automobile highway, for example. Typical inclinations may range between 30° and 60° from the horizontal.

The method comprises rotatably mounting a screw auger 39 or 42 generally parallel to the inclined surface to be paved, and transverse to the longitudinal axis of such surface, the elevation of the screw above the inclined surface being such that the lower peripheral portions of the blade 44 extend only a short distance beneath the plane of the surface of the finished pavement. Concrete is then fed to one or more points adjacent each screw element 39 and 42, relatively near the upper end thereof, so that the concrete flows downhill due to the action of gravity and due to the agitating effect of the screw. The screw is rotated about its longitudinal axis, as previously stated. The rate of concrete feed through chute 64 is sufficient that substantial quantities of concrete are present in and adjacent each screw 39 and 42 (Figure 4). The rotational speed of the screw is caused to be such that the desired amounts of concrete are properly distributed over the inclined surface to be paved, as previously stated. It has been found, in extensive tests made with the apparatus of Figures 1–5, that the normal speed range is between 20 and 70 r.p.m., usually about 40 r.p.m. This may be accomplished with a small engine 51, such as 3½ horsepower.

Each side-hill screw element 39 and 42 performs many functions (previously indicated) relative to mixing, working, compacting, tamping, etc., the concrete mix. The screw causes placing of the larger aggregates a predetermined distance below the surface, so that a surface pad of grout is provided to make possible a proper finishing operation by means located to the rear of the screw. Scraper or shroud means are provided rearwardly of the screw, and forwardly to the finishing means, to maintain a substantial quantity of concrete in the screw and forwardly thereof, and to level off the excess concrete prior to finishing.

As shown best in Figure 1, the helical blades of screws 39 and 42 are so wound that, in order to effect the previously-indicated upward feeding of the concrete within the confines of the screws, the screws must rotate in the same direction and counter-clockwise as viewed in Figure 4. Stated otherwise, each screw 39 and 42 rotates in such a direction that the lower peripheral blade portion thereof is moving away from shroud means 57, and the upper peripheral blade portion thereof is moving toward shroud means 57. This has the effect of relieving the pressure of the concrete forwardly adjacent each mold board 34, so that even a relatively light machine will not be "floated" on the concrete but will instead remain supported on tracks 17.

The blade 44 of each screw 39 and 42 continuously pulls concrete forwardly (beneath shaft 43) from adjacent mold board 34, folds the concrete upwardly and rearwardly over the shaft 43 of the screw, and deposits the folded concrete between the upper peripheral portion of the screw blade and the shroud means 57. Not only is the pressure beneath the screw thus continuously relieved, as stated above, but the concrete is continuously mixed, worked, compacted, etc., to increase the strength and uniformity of the resulting slab.

With more specific reference to the apparatus shown in Figures 1-4, the method comprises mounting each inclined screw 39 and 42 in such manner that it extends rearwardly at a substantial angle from a vertical plane which is perpendicular to the ditch axis, so that gravity moves the concrete (from a point forwardly above the screw) both against the screw and (in combination with the agitating effect of the screw) downhill at an angle. This assures that a substantial quantity of concrete will be maintained in the screw for working and movement thereby. When the inclined surface is relatively steep, the angle of the screw relative to the above-mentioned vertical plane is caused to be relatively great. Conversely, when the inclined surface is at a lesser angle from the horizontal, the angle between the screw and the above-mentioned vertical plane may be less.

In the operation of the apparatus of Figures 1-4, the coarse rod or wire mesh 12 is placed on small concrete blocks 13 in the ditch, and the tracks 17 are mounted on the posts 18 and on form and support plates 19. The turnbuckle wheels 27 are then rotated to adjust the elevation of frame 21, and thus of pressure and finishing plates 29, 32, 34 and 37, as described with relation to Figures 3 and 4. Pressure adjustment is further effected by means of the screws 33, 36 and 38. Furthermore, the berm finishing plates 71 (Figure 2) are adjusted as described above, and the pressure thereon is regulated by the pressure screws 75.

After everything is properly adjusted, the engines 51 and 66 for the screw augers and the conveyors 61 and 62 are started, and the entire apparatus is moved forwardly on wheels 14 by means of a cable extended to a winch or tractor at the bottom or side of the ditch. The apparatus is moved forward substantially continuously, during feeding of concrete into hopper 63, and at a rate such as 700 to 1,000 or more feet per working day.

Engine 51 operates through reduction gearing 52, shafts 53 and 54, and sprocket and chain means 56 to rotate the screw augers 39-42. Engine 66 operates to drive the concrete conveyors 61 and 62 in order that concrete will feed to the upper portions of ditch side walls 11, forwardly adjacent screw augers 39 and 42, while concrete is fed into the hopper 63 from a transit-mix truck.

The concrete which drops in advance of the upper portions of augers 39 and 42 flows downhill and into the augers because of the above-mentioned angular relationship. The previously-described downhill currents are then set up adjacent the augers, and uphill currents are produced in the augers themselves because of the rotation thereof in directions tending to move concrete uphill. The operator watches the distribution of concrete and adjusts the throttle T of engine 51 in such manner as to cause proper distribution along the side walls 11.

By the time the concrete passes beneath the mold boards 34 (Figure 4), it has been mixed, worked, compacted and properly tamped so that the coarser aggregates are below the surface. The surface pad of grout is then properly finished by the mold boards 34 and subsequently by finishing plates 37. Finishing is achieved in the ditch bottom by means of the pressure plate 29 and finishing plate 32 (Figure 3).

Figure 5:
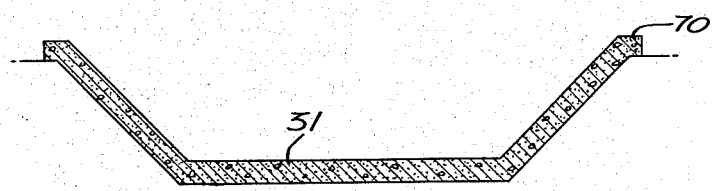
Figure 5 is a transverse sectional view illustrating the monolithic concrete slab formed in the ditch by the apparatus and method of Figures 1-4.

After the operation is completed, it is merely necessary to remove the tracks 17, posts 18, and forms 19 to produce the end product illustrated in Figure 5.

*Embodiment of Figures 6 and 7*

In the apparatus illustrated schematically in Figure 6, the screw augers 39a and 42a are short and only extend part way up the ditch sides 11. Also, the horizontal screw augers 40a and 41a are unitary (or axially connected) but with their blades wound in opposite directions. The concrete may be poured in the center of the ditch and fed by the screw augers 39a, 40a, 41a, and 42a up the short sides to the rails 17a.

Wheels 14a are associated with axles 16a and corresponding equipment as in the case of the previous embodiment. However, in place of the relatively large frame 21 of the previous embodiment there is provided a boat element 76 adapted to put finishing pressure on the concrete to the rear of the screw augers.

The apparatus of Figure 6 operates to pave a runway or track 77, as shown in Figure 7, having a flat bottom and relatively short inclined sides. Such runway 77 is adapted to guide the apparatus of Figures 11-15 as will be described hereinafter.

*Embodiment of Figures 8-10*

The embodiment of Figures 8-10 corresponds in principle to the embodiment of Figures 1-4, but additionally provides adjustment means to adapt the apparatus for ditches of different sizes and angular shapes. For example, the ditch shown in Figure 8 has a shallow V-shaped bottom 10a instead of the previously-described flat bottom 10.

The apparatus schematically represented in Figure 8 includes the mold boards 34b and associated screw augers 39b and 42b which are illustrated only schematically. It is to be understood that apparatus corresponding to the scraper and shroud means 57 is also provided as is drive means for the screw augers. The augers in the ditch bottom 10a are omitted, however, so that the shafts of inclined augers 39b and 42b are mounted at their lower ends in bearings indicated at 78. The lower ends of mold boards 34b are pivoted at 79 to an adjustable pressure element 81 having two side portions 82 and a center portion 83. The center portion 83 is V-shaped to correspond to the shape of ditch bottom 10a, and is provided with an upstanding bracket 84 through which a horizontal shaft 85 is mounted in fixed relationship. The ends of shaft 85 are removably mounted in lugs 86 welded (or pivotally mounted) on side elements 82.

Most of the frame 21b is not illustrated in Figure 8, but it is to be understood that the illustrated horizontal components of the frame 21b are pivotally connected to ears or cranks 22b corresponding to the members 22 in the embodiment of Figures 1–4. The shafts 16b of the apparatus are thus connected by such horizontal components which extend longitudinally of the ditch. Rigidly secured to the above-mentioned longitudinally-extending components of frame 21b are vertical posts 87 the lower ends of which are pivoted at 88 to adjustment plates 89 welded to the mold boards 34b. Screw and slot connections 90 are provided between adjustment plates 89 and posts 87 to prevent relative rotation therebetween about pivots 88 after the desired angular relationship is achieved. The posts 87 each have a number of vertically-spaced holes to receive screws 90a threaded into frame 21b, thus permitting adjustment of the elevation of the frame relative to the axles.

To adjust the mold boards 34b and associated equipment, including the screw augers 39b and 42b which are adjusted therewith, it is necessary to loosen the screw and slot connections 90 and pivot the mold boards 34b about pivots 88. Screws 90a are then mounted in the proper holes determined by the desired elevations of the mold boards. The axles 16b comprise telescoped components, permitting adjustment of the lengths thereof.

Except as indicated, the embodiment of Figure 8 operates the same as the embodiment of Figures 1–4. It produces the end product indicated at 92 in Figure 9.

Referring next to Figure 10, an end product 92a is indicated which has a flat bottom portion 93 instead of the shallow V-shaped bottom portion of Figure 9. To provide for forming of such flat bottom portion, it is merely necessary to remove the center element 83 (Figure 8) and substitute therefor a corresponding center element which has a flat bottom instead of a shallow V-shaped bottom. The flat-bottomed center portion, not shown, is mounted in a manner generally corresponding to the mounting of center portion 83, this being possible because of pivoting of side portions 82 about pivot points 79. In similar manner, the rounded bottom 92b may be provided by substituting a rounded center element for the center element 83 of Figure 8. Center elements of different shapes and widths may also be provided.

Embodiment of Figures 11–15

The embodiment of Figures 11–15 incorporates screw augers which are substantially fully shrouded, and also incorporates support or motive means which are guided on the runway 77 formed as described with relation to Figures 6 and 7. Parts which correspond to those described with relation to previous embodiments have been given corresponding reference numerals.

The apparatus may be mounted on a conventional wheeled tractor indicated at 101, although it is preferred that the tractor incorporate means to effect separate steering of the forward and rear wheels and thereby facilitate adjustment of the position of the apparatus.

Rigid, vertically-extending A-frames 102 are suitably mounted at the forward and rear ends of tractor 101. The A-frames are connected to each other by longitudinally-extending side members 103, by longitudinal connectors 104 which extend beneath the tractor, and by upper tubular longitudinal connectors 106 which extend between the upper or apex ends of the A-frames. Additional rigidity is imparted to the supporting apparatus by means of vertical braces 107 which extend downwardly from the apexes of A-frames 102 to the center portions of the cross members thereof. All of the elements 102–104, 106 and 107 are rigidly connected to each other and are suitably mounted on tractor 101. It is within the scope of the invention, however, to provide suitable joint means on the frame and other elements in order to facilitate operation of the apparatus in paving corners in the ditch or channel.

Suitable inclined frames 108 are adjustably supported at each side of tractor 101, and may comprise a plurality of rigidly connected angle irons as indicated. The lower end of each frame 108 laps over the upper inclined edge of the previously-formed track or runway 77 and is pivotally supported or journaled on a longitudinally-extending support bar 109. As best shown in Figure 11, each bar 109 at each of its end portions is suitably associated with the piston rod 111 of a pneumatic or hydraulic cylinder 112, the latter being pivotally supported on the A-frame 102. An additional cylinder 113 is provided for each frame 108 at each end of the tractor, having one end pivotally connected to the A-frame and having its piston rod suitably associated with an end portion of longitudinal support bar 109 through a bracket 114.

The cylinders 112 and 113 may be operated to move the lower ends of frames 108, and associated screw and finishing means, toward and away from tractor 101 to provide the desired adjustment. Means are also provided to lift the lower ends of the frames by effecting upward pivoting of cylinders 112 and 113 about their supporting axes, such means comprising in each instance a link 116 pivotally connected between cylinder 112 and a crank 117. The crank 117 is non-rotatably connected to a shaft which in each instance extends longitudinally and rotatably through one of the upper tubular connectors 106. A second crank 118 is non-rotatably mounted on such shaft near the center portion of the tractor. Crank 118 extends outwardly for connection to the piston rod 119 of an additional and upwardly-extending pneumatic or hydraulic cylinder 121, the latter being pivotally connected to a longitudinal connector 104.

Operation of each cylinder 121 to effect upward movement of its associated piston rod 119 effects upward movement of the second crank 118 and corresponding upward movement of each first crank 117. This, in turn, lifts the connected link 116 to effect upward pivoting of cylinders 112 and 113 and the connected lower end of frame 108. The lower ends of the two frames 118 may thus be adjusted, independently of each other.

In order to adjust the upper end of each frame 108 and insure application of the desired pressure on the concrete, additional and relatively long pneumatic or hydraulic cylinders 122 are swivelly connected to a bracket 123 which is suitably supported above the connectors 106. The piston rod 124 for each cylinder 122 is pivotally connected through a yoke 126 to the upper portion of the frame 108. It follows that operation of the cylinders 122, conjointly or independently, may effect upward or downward pivoting of the frames 108 about axes which extend through the support bars 109.

Means are provided to guide the tractor 101 and the frames 108 to insure proper elevation of the frames so that the resulting concrete slabs have the required thickness. Such means comprise guide rollers 127 mounted on inclined axes and connected to the lower outer leg ends of A-frames 102. The rollers 127 roll along the inclined side portions of track or runway 77 and thus effect guiding and centering of the tractor 101 and associated apparatus. Additional and elongated rollers 128 are mounted on brackets 129 at the upper edges of frames 108 and roll along combination form and track elements 130 to maintain the upper frame ends in the desired elevated positions. The form and track elements 130 may comprise upwardly-extending boards or plates which are suitably mounted at the upper edges of the ditch or channel by means such as posts, not shown.

Suitable seal means, including an abrasion-resistant rubber or plastic pad or strip 131, is suitably secured longitudinally beneath the lower edge of each frame 108, as best shown in Figure 15. The seal is in continuous contact with the upper inclined edge surface of track or runway 77, and prevents the wet concrete from running thereon.

Each frame 108 is provided with mold boards 34b, finishing plates 37b, and adjustment screws 38b, as described in detail with relation to Figures 2 and 4. Unshown adjustment screws for the mold boards are also provided as described with relation to numeral 36 in Figure 4. In addition, the plates or scraper elements 71b, etc., are provided to finish the berm.

Screw augers 39b and 42b, corresponding to the augers 39 and 42 previously described, are journalled at the forward edges of frames 108 by means of suitable bearings indicated at 132. Such augers are driven from engines 133 on frames 108 by means of shafts 134 and sprocket and chain means 56b. The direction of rotation is, as in previous embodiments, such that the concrete within the confines of the screw blades tends to be moved uphill. Such direction is clockwise, as viewed in Figure 14.

Each auger 39b and 42b is housed or shrouded, throughout substantially its entire length, in a loosely fitting manner which permits downward flow of concrete through the shroud around the auger at the same time that upward flow is taking place within the confines of the auger. Thus, and as best shown in Figure 14, a scraper and partial shroud means 57b is provided to the rear of each screw auger and connected to frame 108 adjacent the forward edge of mold board 34b. Element 57b is connected to or integral with an upper shroud portion 136 which is disposed a substantial distance above the screw auger. Portion 136, in turn, is integral with a forward or dam portion 137 which extends downwardly in advance of the screw auger for substantially the entire distance to the mesh or reinforcing elements 12. Suitable resilient means, indicated schematically at 138, are connected to supporting brackets 139 on frames 108 to maintain the combination shroud elements 57b, 136 and 137 resiliently in the desired positions.

It is pointed out that the scraper and partial shroud means 57b may also be termed a "wall means" or "dam means." Similarly, the forward or dam portion 137 may be termed a "wall means" or "dam means."

For an auger having a nine inch diameter, as in the previous illustration, the upper shroud portion 136 may be, for example, about six inches above the upper edge of the auger. Element 57b may be spaced, for example, about two inches from the auger. The result is that a substantial clearance is provided which permits downflow of concrete even though (and because) the auger is being rotated. Means may be provided to adjust such clearance in accordance with factors including the height of the slope. The indicated dam and shroud means may thus be maintained substantially full of wet concrete, it being understood that the lower end of the shroud is provided with a transverse wall, shown at 141 in Figure 15, which prevents the concrete from spilling out onto the previously-formed track 77. Wall 141 cooperates with seal 131, and with other unshown sealing means, to prevent the concrete from leaking out around the lower end of the shroud. The upper end of the shroud is open in order that concrete may be fed downwardly into the shroud through suitable conveyor means, not shown.

It is to be understood that the showings of Figures 11–15 are relatively schematic, and that additional means may be provided to support the shroud means 57b, 136 and 137.

*Method with relation to the embodiment of Figures 11–15*

Stated generally, the method comprises confining concrete adjacent each screw auger but with sufficient clearance that concrete will flow downwardly while the screw is being rotated in the up-feed direction. Concrete is then fed to the region around the auger, near the upper end thereof, and flows downwardly due to the effect of gravity, and the agitation caused by the screw. The screw is rotated in the direction tending to feed concrete upwardly, which has the combined result of distributing and equalizing the pressure of the concrete, working, mixing and placing the concrete, compacting the same, etc.

It is pointed out that, in this and the previous embodiments, there is a large void beneath each screw, that is to say between it and the ditch side wall 11. Thus, in order for the space between shroud 57b and dam 137 to be maintained full of concrete at least to the upper peripheral portion of the screw blade, a very large volume of concrete must be fed continuously from the transit-mix truck to the vicinity of upper end of the screw and between elements 57b and 137. Each auger operates to mix, agitate, work, fold, compact, tamp, relieve pressure, etc., as described with relation to the previous embodiments.

In performing the method with the specific apparatus of Figures 11–15, and assuming that the runway 77 has previously been formed as stated heretofore, the combination form and track elements 130 are first positioned adjacent the upper edges of the ditch. The tractor 101 is then disposed in the ditch with the guide rollers 127 rolling in guiding or track relationship relative to the inclined edges of the runway 77. Suitable means, not shown, may be provided to adjust the exact positions of the rollers 127.

The cylinders 112, 113 and 121 are then operated to adjust the exact positions of the lower edges of frames 108 and the associated auger and finishing means. Thus, if it is desired to move the lower frame edges downhill, cylinders 112 and 113 are operated to shift their piston rods inwardly. If it is desired to raise the lower edges of the frames, cylinders 121 are operated to shift their piston rods 119 upwardly, which raises the cranks 118 and correspondingly raises the cranks 117 connected thereto. Links 116 are thus raised to effect upward pivoting of the cylinders 112 and connected apparatus.

The positions of the upper edges of the frames are controlled by guide rollers 128 on boards 130, and also by the cylinders 122 and connected piston rods 124 and yokes 126. The seal means 131 are employed as shown in Figure 15, in conjunction with elements including the lower end walls 141 of the shroud means, to prevent the concrete from spilling out onto the runway 77.

The berm plates 71b are then adjusted by means of elements 73b and 75b, and mold boards 34b and finishing plates 37b are likewise adjusted to provide the desired finishing pressures and slab thicknesses.

It is then merely necessary to operate the engines 133 to rotate augers 39b and 42b in the directions tending to effect upward movement of concrete, and to substantially continuously feed concrete into the upper ends of the shroud elements (57b, 136 and 137) to effect the above-recited results.

The end result is that side slabs, indicated at 142 in Figure 12, are joined to the edges of the runway 77 to provide the complete ditch lining. The joints between slabs 142 and the edges of runway 77 are strong, and are spaced sufficiently far above the bottom of the ditch that they will be maintained relatively dry even though small amounts of water are present in the ditch.

It is within the scope of the invention to lay each side slab 142 separately, particularly in situations where the ditch is a relatively wide one.

As indicated previously in this specification, the terms "inclined," "steeply inclined," etc., as employed in the specification and claims, denote inclinations from the horizontal on the order of 30° to 60°. The inclinations are at least substantially greater than the inclinations of pavements at the curves of highways, but on the other hand do not approach the vertical.

Throughout the specification and claims, reference to the screw as "rotating in a direction tending to feed concrete upwardly," etc., refers to the direction of feed which would result if the screw were closely housed, as in a tube having a diameter only slightly greater than that of the screw.

Throughout the claims reference to the screw, etc., as being "parallel" to the side wall of the ditch, means that the screw lies in a plane which is generally parallel to the plane of the side wall. On the other hand, reference to the screw, etc., as being "transverse" to the side wall of the ditch, means that the screw is transverse to the longitudinal axis of such side wall.

Various embodiments of the present invention, in addition to what has been illustrated and described in detail, may be employed without departing from the scope of the accompanying claims.

I claim:

1. Apparatus for placing concrete on a surface which inclines relatively steeply from the horizontal whereby concrete deposited at the upper portion thereof will flow downwardly at a substantial rate; which apparatus comprises an elongated shaft, means to mount said shaft in spaced generally parallel relation above said surface and with one end of said shaft at an elevation substantially above that of the other end thereof, blade means mounted on said shaft at substantially all longitudinal points therealong to effect mixing, placing, working, compacting and tamping of concrete fed thereto, wall means mounted generally parallel to said shaft and blade means both forwardly and rearwardly thereof and generally perpendicular to said surface to confine concrete in the vicinity of said shaft and said blade means carried thereby, said wall means being spaced sufficiently far from said blade means to prevent the larger aggregates from binding between said blade means and wall means, means to rotate said shaft about the longitudinal axis thereof whereby said blade means is rotated about the longitudinal shaft axis to effect said operations on said concrete, and means to effect translational movement of said shaft and said wall means along said surface.

2. Apparatus for placing and finishing concrete on at least one side wall of an elongated ditch or channel, said side wall lying in a plane which inclines from the horizontal at a steep angle; which apparatus comprises a frame, means to move said frame along said side wall in a given direction, an elongated screw auger, means to mount said screw auger on said frame transversely of the longitudinal axis of said side wall and in a plane generally parallel to the plane of said side wall, said mounting means being such that said screw auger is disposed at a substantial angle to a vertical plane which is perpendicular to the longitudinal axis of said ditch or channel and with the lower end of said screw auger disposed a substantial distance in advance of the upper end thereof, means to rotate said screw auger about the longitudinal axis thereof, wall means mounted on said frame to the rear of said screw auger and generally parallel and adjacent thereto, said wall means serving to maintain substantial amounts of wet concrete in and adjacent said screw auger, and finishing means mounted on said frame to the rear of said wall means and at a working elevation only a short distance above the elevation of the lower peripheral portion of the blade of said screw auger, said finishing means and said lower peripheral blade portion of said screw auger being spaced above said side wall and being generally parallel thereto.

3. The invention as claimed in claim 2, in which a second wall means is mounted on said frame forwardly of said screw auger and generally parallel thereto, said second wall means and said first-mentioned wall means cooperating to maintain concrete in and adjacent said screw auger, both of said wall means being spaced sufficiently far from the peripheral blade portions of said screw auger to permit flow of concrete in downward directions adjacent said screw auger and without the confines thereof.

4. Apparatus for placing and finishing concrete along at least one side wall of an elongated ditch or channel, said side wall lying generally in a single plane and inclining at a relatively steep angle from the horizontal; which apparatus comprises an elongated screw, frame means to mount said screw transversely of said side wall and spaced thereabove generally parallel thereto with one portion of said screw relatively adjacent the upper edge portion of said side wall and another portion of said screw relatively adjacent the bottom of the ditch, means to rotate said screw about the longitudinal axis thereof and in a direction tending to feed concrete upwardly along said side wall, dam means mounted on said frame means both forwardly and rearwardly of said screw and generally parallel thereto, said dam means being spaced sufficiently far from said screw to permit passage of aggregates between said dam means and said screw and in downward directions, and means to translate said screw and said dam means along said side wall.

5. In an apparatus for laying a slab of conrete on a steeply inclining side wall of a ditch or channel, an elongated screw auger, means to mount said screw auger transversely of said side wall and generally parallel thereto with one end portion of said screw auger relatively adjacent the upper edge of the ditch in comparison to the other end portion of said screw auger, means to effect rotation of said auger about the longitudinal axis thereof and in a direction tending to effect upward feeding of the concrete disposed in said screw auger, means to effect downward feeding of concrete adjacent said screw auger and generally longitudinally thereof to thereby set up oppositely-directed uphill and downhill currents of concrete, and shroud means mounted longitudinally above and on both sides of said screw auger, said shroud means being spaced sufficiently far from said screw auger to permit downward flow of concrete between said screw auger and shroud means despite rotation of said screw auger in said direction tending to effect upward movement of the concrete within the confines thereof.

6. In an apparatus for paving the steeply inclining side wall of a ditch or channel, a screw auger, means to mount said screw auger transversely of said side wall in spaced generally parallel relationship thereabove, means to rotate said screw auger in a direction tending to effect upward movement of the concrete therein, concrete-confining means, and means to mount said confining means longitudinally adjacent both sides of said screw auger to confine concrete therein and adjacent thereto, at least part of said confining means being spaced a sufficient distance from said screw auger to provide a passage through which concrete may flow longitudinally adjacent said screw auger in a downward direction.

7. A ditch paving machine, which comprises wheel means adapted to ride along tracks at the upper portions of the ditch to be paved, a frame, means to adjustably support said frame from said wheel means whereby the elevation of said frame may be regulated, a pressure plate mounted on said frame generally parallel to the bottom of the ditch, mold boards mounted on said frame generally parallel to each inclined side of the ditch, finishing plates mounted on said frame rearwardly of said mold boards and adjustable to control the finish of the concrete, scraper and shroud means mounted on said frame and having their lower edges terminating at the forward edges of said mold boards, said scraper and shroud means extending upwardly for a substantial distance, screw means mounted on said frame generally parallel to each inclined side of the ditch and immediately in advance of said scraper, said screw means shroud means and having their lower peripheral portions disposed only a short distance beneath the lower surfaces of said mold boards, said screw means and said scraper and shroud means having their lower ends disposed substantially forwardly of their upper ends, means to rotate said screw means in a direction tending to effect upward movement of concrerte, and means to feed concrete to the upper portions of said screw means and forwardly thereof whereby said concrete gravitates downwardly against and along said screw means.

8. The invention as claimed in claim 7, in which said last-named means comprises a long feed conveyor and a short feed conveyor mounted above said frame and having lapped end portions disposed adjacent each other, hopper means mounted above said lapped end portions, and means to rotate said conveyors and hopper means conjointly about a vertical axis located at the center portion of said frame whereby said lapped end portions and said hopper means may be disposed alternately adjacent opposite sides of the ditch.

9. In a ditch paving machine adapted to ride along rails on opposite edges of the ditch, wheels mounted upon said rails, at least two axles connecting opposite ones of said wheels and adjustable in length, screws disposed transversely of the side walls of the ditch, and means to adjustably support said screws from said axles in a manner permitting variation in the angles of said screws relative to the horizontal, thereby permitting adjustment of the machine for different sizes and shapes of ditches.

10. Apparatus for paving a relatively steeply inclined side wall of a ditch or channel, which comprises a vehicle adapted to ride in said ditch or channel and adjacent said side wall, frame means mounted on said vehicle above said side wall, means to maintain said frame means at a desired elevation above said side wall, an elongated screw auger mounted on said frame means in spaced parallel relationship above said side wall and transverse thereto, dam means mounted on said frame means adjacent said screw auger for substantially the full length thereof and adapted to maintain substantial quantities of wet plastic concrete in and adjacent said screw auger, and means to rotate said screw auger about the longitudinal axis thereof in order to effect mixing, compacting, placing, working, tamping and other operations relative to said concrete.

11. The invention as claimed in claim 10, in which said dam means comprises generally vertical dam elements mounted respectively forwardly and rearwardly of said screw auger in spaced relation therefrom, and in which finishing means are mounted rearwardly of the rear dam element to finish the concrete placed by said screw auger.

12. A method of paving with concrete the steeply inclined side wall of a ditch or channel, which method comprises disposing an elongated bladed element transversely of said side wall in spaced generally parallel relation thereabove, rotating said element about the longitudinal axis thereof, feeding plastic concrete continuously to said element at a point relatively adjacent the upper portion of said side wall, maintaining said concrete in and adjacent said element whereby said concrete is worked and mixed by said element, translating said element along said ditch, and effecting finishing of the concrete to the rear of said element to provide a completed concrete slab.

13. A method of mixing, distributing, working, placing, compacting and tamping concrete during paving of the steeply inclined side wall of a ditch or channel, which method comprises disposing an elongated screw auger transversely of said side wall in spaced generally parallel relation thereabove, rotating said screw about the longitudinal axis thereof and in a direction tending to effect movement of concrete up said side wall, feeding large quantities of plastic concrete to said screw at a point relatively adjacent the upper portion of said side wall, causing said concrete to be maintained in said screw and closely adjacent the same and to a depth at least above the shaft of said screw, increasing the rate of rotation of said screw when it is desired to cause more concrete to be present at the lower portion of said side wall, and decreasing the rate of rotation of said screw when it is desired to cause less concrete to be present at the lower portion of said side wall.

14. A method of placing and finishing concrete on a relatively steeply inclining side wall of a ditch or channel, which method comprises disposing a screw auger generally parallel to said side wall and transversely of the longitudinal axis of said side wall, disposing dams both forwardly and rearwardly of said screw to confine concrete in and adjacent said screw, rotating said screw about the longitudinal axis thereof in a direction tending to feed substantial quantities of plastic concrete upwardly, feeding substantial quantities of plastic concrete to said screw between said dams and relatively adjacent the upper portion of said side wall, said feeding step being performed at a rate sufficient to maintain the region between said dams filled with concrete at least to the elevation of the axis of said screw, and translating said screw and dams along said ditch with one dam ahead of said screw and the other dam to the rear of said screw.

15. Apparatus for paving with concrete the steeply inclined side wall of a ditch or channel, which comprises a support adapted to be moved along said ditch or channel, an elongated shaft journaled on said support generally parallel to and spaced above said side wall and transverse to the axis of said side wall, blade means mounted obliquely on said shaft, a forward dam mounted on said support in advance of said blade means and spaced therefrom, a rear dam mounted on said support rearwardly of said blade means and spaced therefrom, a mold board mounted on said support generally parallel to said side wall and spaced above said side wall a distance substantially equal to the desired thickness of concrete, said mold board being disposed to the rear of said rear dam, means to rotate said shaft about the longitudinal axis thereof to effect mixing, working, placing, compacting and tamping of the plastic concrete disposed between said dams, and means to translate all of said elements along said side wall.

16. The invention as claimed in claim 15, in which said shaft is so disposed that the lower peripheral portion of said blade means penetrates a short distance below the elevation of the lower surface of said mold board.

17. The invention as claimed in claim 15, in which said blade means comprises a helical blade wound around said shaft in such direction that said blade effects upward feeding of the concrete disposed adjacent said shaft when the lower peripheral portion of said blade is moving toward said forward dam and the upper peripheral portion of said blade is moving toward said rear dam, and in which said means to rotate said shaft about its longitudinal axis effects rotation thereof in such direction that said lower peripheral portion of said blade moves toward said forward dam and said upper peripheral portion of said blade moves toward said rear dam.

References Cited in the file of this patent

UNITED STATES PATENTS

| | | |
|---|---|---|
| 1,967,178 | Jaeger | July 17, 1934 |
| 2,303,336 | Day | Dec. 1, 1942 |
| 2,426,702 | Millikin et al. | Sept. 2, 1947 |

FOREIGN PATENTS

| | | |
|---|---|---|
| 479,208 | Germany | 1929 |
| 65,523 | France | 1955 |

UNITED STATES PATENT OFFICE
CERTIFICATE OF CORRECTION

Patent No. 2,975,602             March 21, 1961

Sylvester V. Stromberg

It is hereby certified that error appears in the above numbered patent requiring correction and that the said Letters Patent should read as corrected below.

Column 14, line 63, after "scraper" insert -- and shroud means --; line 64, strike out "shroud means and"; line 70, for "concrerte" read -- concrete --.

Signed and sealed this 6th day of February 1962.

(SEAL)
Attest:

ERNEST W. SWIDER
Attesting Officer

DAVID L. LADD
Commissioner of Patents